(12) United States Patent
D'Ercoli et al.

(10) Patent No.: US 11,146,540 B2
(45) Date of Patent: Oct. 12, 2021

(54) SYSTEMS AND METHODS FOR PUBLIC KEY EXCHANGE EMPLOYING A PEER-TO-PEER PROTOCOL

(71) Applicant: Datalogic IP Tech S.R.L., Bologna (IT)

(72) Inventors: Francesco D'Ercoli, Bologna (IT); Simone Cilli, Bologna (IT); Marco Cumoli, Monte San Pietro (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 220 days.

(21) Appl. No.: 15/975,095

(22) Filed: May 9, 2018

(65) Prior Publication Data
US 2019/0349342 A1 Nov. 14, 2019

(51) Int. Cl.
| | |
|---|---|
| *H04L 29/06* | (2006.01) |
| *G06F 21/44* | (2013.01) |
| *H04L 9/32* | (2006.01) |
| *H04L 9/06* | (2006.01) |

(Continued)

(52) U.S. Cl.
CPC ............ *H04L 63/061* (2013.01); *G06F 21/44* (2013.01); *H04L 9/0656* (2013.01); *H04L 9/3236* (2013.01); *H04L 9/3263* (2013.01); *H04L 63/08* (2013.01); *G06F 7/582* (2013.01); *H04L 67/104* (2013.01)

(58) Field of Classification Search
CPC .................. H04W 12/06; H04W 84/18; H04W 12/04071; H04L 63/061
See application file for complete search history.

(56) References Cited

U.S. PATENT DOCUMENTS

| | | | | |
|---|---|---|---|---|
| 5,363,448 | A | * | 11/1994 | Koopman, Jr. ......... G06F 7/584 340/5.26 |
| 6,052,466 | A | * | 4/2000 | Wright .................... H04L 9/065 380/262 |
| 6,286,008 | B1 | * | 9/2001 | Matsumoto ............. G06F 21/10 |

(Continued)

FOREIGN PATENT DOCUMENTS

WO 2017/188895 A1 11/2017

OTHER PUBLICATIONS

Nakamoto, "Bitcoin: A Peer-to-Peer Electronic Cash System," available on the Internet at <<https://bitcoin.org/en/bitcoin-paper>>, retrieved on Apr. 19, 2018.

(Continued)

*Primary Examiner* — James R Turchen
(74) *Attorney, Agent, or Firm* — Foley & Lardner LLP

(57) ABSTRACT

Embodiments disclosed herein describe systems and methods for authenticating a new device to operate on a network using peer-to-peer protocol key exchange. An existing network node sharing common secret seed information may initially exchange public keys with the new device. After the initial exchange, the network node and the new device may exchange one or more protocol messages. A received protocol message may include a pseudo-random number generated based upon a challenge position in a previously sent protocol message. If the network node determines a match between the received pseudo-random number at the challenge position and a locally generated pseudo-random number, the network node may authenticate the new device to the network.

20 Claims, 11 Drawing Sheets

(51) Int. Cl.
   *H04L 29/08* (2006.01)
   *G06F 7/58* (2006.01)

(56) References Cited

U.S. PATENT DOCUMENTS

| | | | | |
|---|---|---|---|---|
| 6,799,270 | B1* | 9/2004 | Bull | H04L 63/062 713/153 |
| 8,402,267 | B1* | 3/2013 | Graham | G06F 21/53 713/164 |
| 8,824,677 | B1* | 9/2014 | Ramzan | H04L 9/0869 380/268 |
| 9,451,573 | B2* | 9/2016 | Erickson | H04L 61/6059 |
| 9,780,952 | B1 | 10/2017 | Behm et al. | |
| 2002/0161884 | A1* | 10/2002 | Munger | H04L 61/2007 709/224 |
| 2003/0233550 | A1* | 12/2003 | Brickell | H04L 9/0841 713/171 |
| 2004/0190718 | A1* | 9/2004 | Dacosta | H04W 12/06 380/247 |
| 2005/0208891 | A1* | 9/2005 | Khare | G06F 21/43 455/39 |
| 2006/0053289 | A1* | 3/2006 | Singh | H04L 9/321 713/169 |
| 2006/0095379 | A1* | 5/2006 | Kim | G06F 21/602 705/51 |
| 2007/0177613 | A1* | 8/2007 | Shorty | H04L 65/607 370/401 |
| 2008/0069338 | A1* | 3/2008 | Relyea | H04L 9/3234 380/28 |
| 2008/0077976 | A1* | 3/2008 | Schulz | H04L 9/3263 726/5 |
| 2008/0109654 | A1* | 5/2008 | Hardacker | H04W 12/04 713/162 |
| 2009/0028335 | A1* | 1/2009 | van de Groenendaal | H04W 12/033 380/274 |
| 2009/0073942 | A1* | 3/2009 | Qin | H04W 8/005 370/338 |
| 2010/0180130 | A1* | 7/2010 | Stahl | G06F 21/10 713/193 |
| 2011/0032842 | A1* | 2/2011 | Patil | H04W 8/26 370/254 |
| 2011/0164749 | A1* | 7/2011 | Natarajan | H04L 9/3228 380/270 |
| 2013/0145169 | A1* | 6/2013 | Poovendran | H04L 9/3242 713/181 |
| 2013/0152195 | A1* | 6/2013 | Nandha Premnath | G06F 21/606 726/22 |
| 2013/0318632 | A1* | 11/2013 | Keoh | H04L 63/0807 726/28 |
| 2015/0033016 | A1* | 1/2015 | Thornton | H04L 63/061 713/171 |
| 2015/0207630 | A1* | 7/2015 | Shimoyama | G06Q 20/3823 713/186 |
| 2015/0245204 | A1* | 8/2015 | Heydon | H04L 45/02 713/171 |
| 2015/0295720 | A1* | 10/2015 | Buldas | H04L 9/3263 713/176 |
| 2015/0341178 | A1* | 11/2015 | Tanaka | H04L 9/32 713/156 |
| 2016/0269975 | A1* | 9/2016 | Watanabe | H04L 45/123 |
| 2016/0373418 | A1* | 12/2016 | Stahl | H04L 63/062 |
| 2017/0264427 | A1* | 9/2017 | Hollis | H04L 9/065 |
| 2017/0264597 | A1* | 9/2017 | Pizot | H04L 63/126 |
| 2017/0272257 | A1* | 9/2017 | Satoh | H04L 9/3268 |
| 2018/0098218 | A1* | 4/2018 | Fogle-Weekley | H04L 63/061 |
| 2018/0254904 | A1* | 9/2018 | Hwang | H04L 63/0815 |
| 2019/0014528 | A1* | 1/2019 | Skillermark | H04W 84/18 |
| 2019/0068382 | A1* | 2/2019 | Theodore | H04L 9/321 |
| 2019/0089532 | A1* | 3/2019 | Lambert | H04L 63/08 |
| 2019/0220618 | A1* | 7/2019 | Ocher | H04L 9/3239 |
| 2019/0253243 | A1* | 8/2019 | Zimmerman | H04L 9/3247 |
| 2019/0334882 | A1* | 10/2019 | Mondello | H04L 9/0866 |
| 2019/0386825 | A1* | 12/2019 | Bhattacharya | H04L 9/0847 |

OTHER PUBLICATIONS

Erickson, Jon. "Exploitation." Hacking, the Art of Exploitation. No Starch Press, 2008. 116-193. Book.
Erickson, Jon. "Networking." Hacking, the Art of Exploitation. No Starch Press, 2008. 195-280. Book.
Erickson, Jon. "Cryptology." Hacking, the Art of Exploitation. No Starch Press, 2008. 393-449. Book.
Ferguson et al., "Hash Functions." Cryptography Engineering: Design Principles and Practical Applications. Wiley, 2010. 77-88. Book.
Ferguson et al., "Generating Randomness." Cryptography Engineering: Design Principles and Practical Applications. Wiley, 2010. 137-161. Book.
Ferguson et al., "Diffie-Hellman." Cryptography Engineering: Design Principles and Practical Applications. Wiley, 2010. 181-193. Book.
Ferguson et al., "RSA." Cryptography Engineering: Design Principles and Practical Applications. Wiley, 2010. 195-211. Book.
McClure et al., "Remote Connectivity and VoIP Hacking." Hacking Exposed. 6th Edition. McGraw Hill Education, 2012. 315-386. Book.
McClure et al., "Wireless Hacking." Hacking Exposed. 6th Edition. McGraw Hill Education, 2012. 445-491. Book.
McClure et al., "Hacking Hardware." Hacking Exposed. 6th Edition. McGraw Hill Education, 2012. 493-514. Book.

* cited by examiner

SYSTEMS AND METHODS FOR PUBLIC KEY EXCHANGE EMPLOYING A PEER-TO-PEER PROTOCOL

BACKGROUND

A popular method to establish a secure communications channel is using asymmetric public/private encryption keys. In this method, a sender encrypts a message with a receiver's public key and transmits the encrypted message through a communications channel. The encrypted message can only be decrypted by the receiver's private key. The communications channel, at least vis-à-vis the encrypted message, therefore becomes secure because an eavesdropper cannot decrypt the encrypted message.

To facilitate the encryption for establishing the secure communications channel, public keys have to be exchanged between the communicating parties. "Key exchange" or "key establishment" is the method used to exchange the public keys between the two parties to allow them for the subsequent use of a known cryptographic algorithm. In most cases, sender and receivers decide to use an asymmetric key cipher along with private/public key pair, such as Diffie-Hellman, Rivest-Shamir-Adleman (RSA), and/or Elliptic Curve Digital Signature Algorithm (ESDSA). Each party needs the other's public key for ciphering (encrypting) outgoing messages, which may then be deciphered (decrypted) using respective private keys that are not shared.

A common bootstrapping problem with asymmetric key encryption is that there is a need to safely manage (or communicate) keys before starting a communication. The communication of the keys may also be referred to as verifying signatures of the communicating parties. Key management is vulnerable to man-in-the-middle (MITM) attack. For example, a malicious user may pretend to be a valid receiver and send his public key to a sender. The unwitting sender may encrypt a message using the malicious user's public key. Upon receipt, the malicious user may decrypt the encrypted message using the corresponding private key.

A popular conventional technology for mitigating MITM attacks is Public Key Infrastructure (PKI) backed by Certificate Authorities (CA). Certificate authorities provide digital certificates, such as X.509, that are electronic documents used to prove ownership of public keys. PKI establishes a set of policies and procedures to create, store, distribute, and revoke digital certificates for public-key encryption. As understood in the art of encryption, digital certificates need to be verified using a chain of trust, including a hierarchy of intermediate certificate authorities and a root certificate authority.

FIG. 1 illustrates an illustrative network environment 100 using conventional technology of hierarchical certificate authorities. FIG. 1 shows two communicating parties: a first party 102 holding a first public/private key pair 104 and a second party 106 holding a second public/private key pair 108. To establish a secure communications channel 110, the first party 102 may transmit the public key of the first public/private key pair 104 to the second party 106 and the second party 106 may transmit the public key of the second public/private key pair 108 to the first party 102. To verify the authenticity of the respective public keys, the parties may use one or more hierarchical certificate authorities 112, 114. The certificate authorities 112, 114 provide their digital signature to the public keys such that a receiving party can trust the received public keys. As shown, certificate authority 112 may function as an intermediate certificate authority that authenticates the respective public keys of the first party 102 and the second party 106. The certificate authority 114 may function as a root certificate authority authenticating both the intermediate certificate authority 112 and the respective public keys of the first party 102 and the second party 104. In other words, digital certificates may be verified with a chain of trust by using a hierarchical arrangement of certificate authorities. The hierarchical arrangement of FIG. 1 may also be required to avoid a single point of failure.

There are several technical shortcomings in the conventional technology of hierarchical certificate authorities for authenticating public keys, especially in the context of a sensor network or an Internet of things (IoT) environment. Compared to the traditional larger networks, a sensor network or an IoT environment may include relatively few nodes with low computing power. Conventional hierarchical certificates are very complex and time consuming due to the processing and memory load of many pre-installed intermediary certificates, different certificate versions, certificate revoking, and/or other issues. Furthermore, the conventional technology of hierarchical certificate authorities is inherently expensive. Each of the parties should purchase the costly digital certificates for the respective public keys. This costly technology may not be feasible for smaller system with fewer nodes.

Therefore, conventional key exchange technology is neither desirable nor feasible for networks formed by relatively few nodes with low processing power. As such, a significant improvement in key exchange technology is desirable.

SUMMARY

Network nodes in a peer-to-peer (P2P) network may be commissioned by providing a common seed thereto. Each of the network nodes may include a pseudo-random number generator (PRNG) that may utilize the common secret seed to generate a pseudo-random number sequence. Having the common seed causes each PRNG to generate the same pseudo-random number at the same position of the sequence (e.g., position number 6 to be generated by the PRNG). A new node attempting to enter a network may transmit, in addition to its public key, a challenge containing a position n1 for PRNGs of one or more existing nodes of the P2P network. In response, the new node may receive a public key of at least one existing node and a pseudo-random number generated by the existing node's PRNG at position n1 or a hash thereof. Furthermore, the existing node may challenge the new node to generate another pseudo-random number at position n2. After each of the existing node and the new node compares and matches the pseudo-random numbers or the hashes thereof for a predetermined number of cycles, the existing node may authenticate the new node and its public key into the network. An MITM attack is avoided because a malicious node does not have a PRNG commissioned with the common secret seed, and therefore cannot generate the pseudo-random numbers at the challenge positions. Furthermore, a certificate authority is not required for the P2P network because the aforementioned key exchange is done locally using node generating challenge messages and responses thereto.

One embodiment of a method for authenticating a new device to operate in a network may include exchanging, by a network node on the network, public keys with the new device to be authenticated. The network node may further exchange one or more protocol messages with the new device, each protocol message containing a pseudo-random number generated by a pseudo-random number generator of either the network node or the new device being a sender using a common secret root information and at a position concatenated in a previously received protocol message, each protocol message being encrypted using the public key of the other of the network node or the new device being a receiver. The network node may also authenticate the new device to the network responsive to the network node determining that a pseudorandom number in a received protocol message matches the pseudorandom number generated locally by the network node at a position concatenated in a previously sent protocol message.

One embodiment of a system for authenticating a new device to operate in a network may include a plurality of network nodes forming the network, the network being a peer-to-peer network. A network node on the network may be configured to exchange public keys with the new device to be authenticated. The network node may also be configured to exchange one or more protocol messages with the new device, each protocol message containing a pseudo-random number generated by a pseudo-random number generator of either the network node or the new device being a sender using a common secret root information and at a position concatenated in a previously received protocol message, each protocol message being encrypted using the public key of the other of the network node or the new device being a receiver. Furthermore; the network node may authenticate the new device to the network responsive to the network node determining that a pseudorandom number in a received protocol message matches the pseudorandom number generated locally by the network node at a position concatenated in a previously sent protocol message.

One embodiment of a method of authenticating a new device to operate in a network may include commissioning a set of network nodes by providing a common secret root information thereto. A network node of the set of nodes may receive a first public key from the new device to be authenticated to the network. The network node may transmit a second public key of the network node to the new device. The network node may receive from the new device, a first protocol message containing a first position for a first pseudo-random number, the first protocol message being encrypted with the second public key. The network node may transmit to the new device a second protocol message containing the first pseudo-random number at the first position generated by the second network node using the common secret root information and containing a second position of a second pseudo-random number, the protocol message being encrypted with the first public key. The network node may receive from the new device a third protocol message encrypted using the second public key in response to the second protocol message. The network node may then authenticate the new device to the network responsive to the network node determining that a pseudo-random number in the third protocol message matches a pseudo-random number generated by the network node at the second position using the common secret root information.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 2:
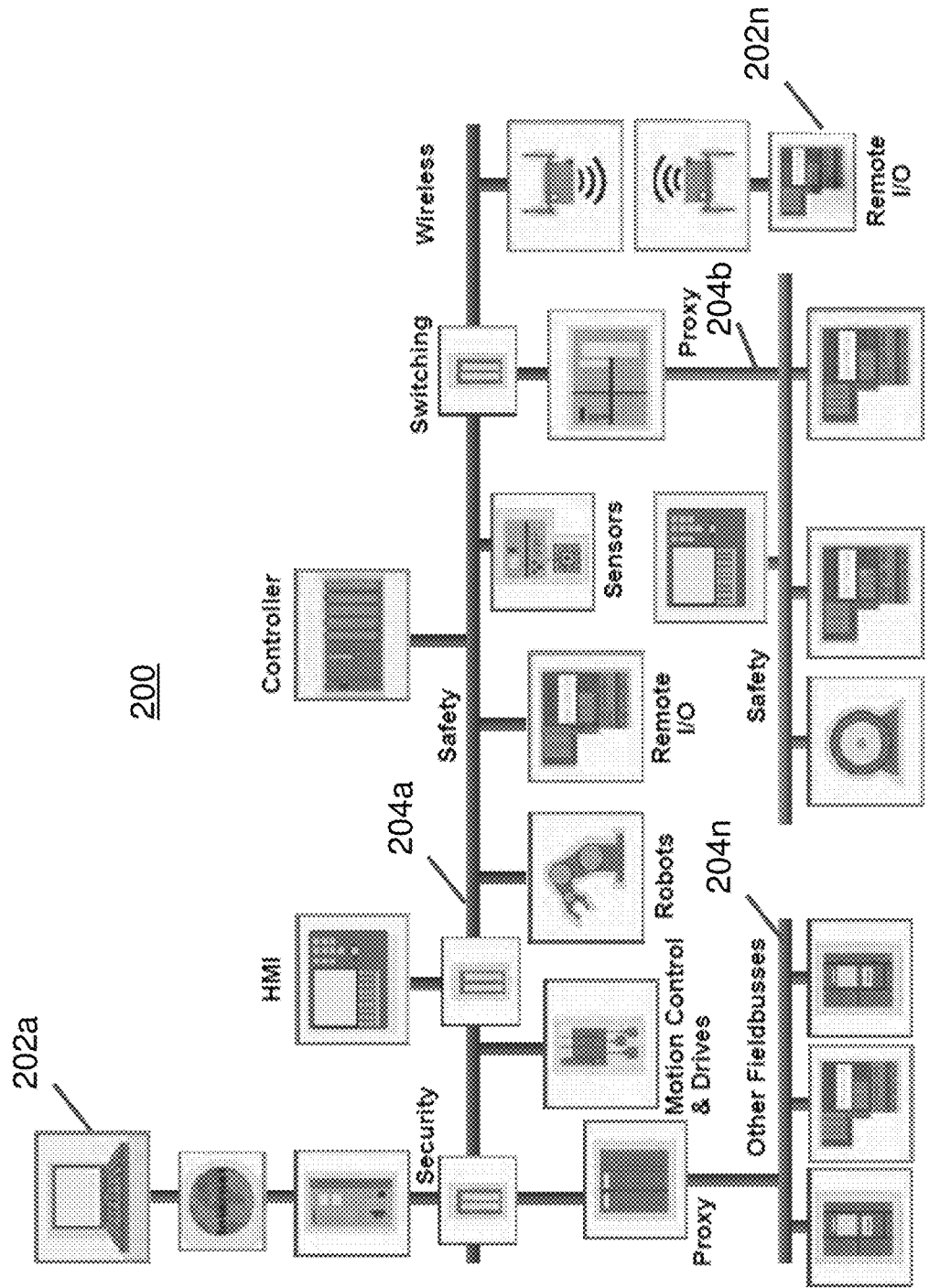
FIG. 2 is an illustration of an illustrative peer-to-peer (P2P) node network environment formed by heterogeneous sensors, heterogeneous communication links, and other computing devices.

With regard to FIG. 2, an illustration of an illustrative network environment 200 is shown. The network environment 200 may include networked devices 202*a*-202*n* (collectively referred to as 202) and communication links 204*a*-204*n* (collectively referred to as 204). The network devices 202 (also referred to as "network nodes" or simply "nodes") may be any type of devices such as sensors, actuators, switches, input/output (I/O) devices, and/or any other type of devices. As an example, the network environment 200 may be within an industrial setting and the network devices 202 may be various monitoring sensors within the industrial setting. As another example, the network environment 200 may be within a human body and the network devices 202 may be various medical sensors. The communication links 204 may be based upon any type of wired or wireless communication technology, non-limiting examples of which may be Ethernet, Wifi, Bluetooth, Local Area Network (LAN), Desk Area Network (DAN), and Wide Area Network (WAN).

The network environment 200 may be a peer to peer (P2P) network environment. In other words, the network devices 202 and the communications links 204 may form a P2P network. A back-end hierarchical certificate authority therefore may be unavailable or otherwise impractical for the network environment 200. Embodiments disclosed throughout this disclosure describe a locally enforced, inexpensive, back-end infrastructure independent, secure key exchange protocol for establishing secure communication channels between the network devices 202 through the communication links 204. In other words, the key exchanges between the network nodes 202 may be provided by a P2P protocol without the overhead and expense of certificate authorities.

Figure 3:
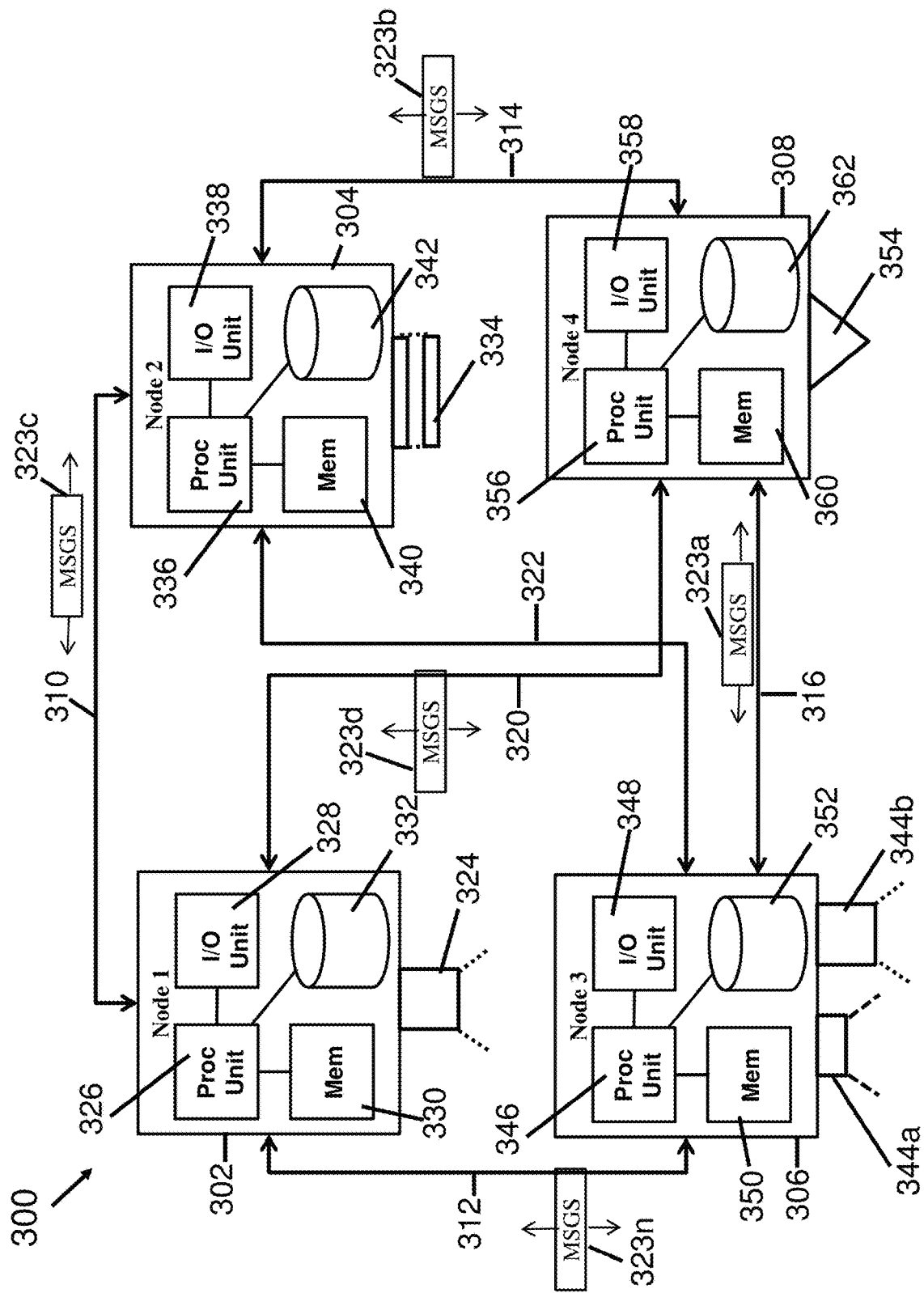
FIG. 3 is a schematic illustration of an illustrative peer-to-peer (P2P) node network environment formed by heterogeneous sensors, heterogeneous communication links, and other computing devices.

With regard to FIG. 3, an illustration of an illustrative node network 300 formed by illustrative nodes (e.g., sensors, actuators, and/or other computing devices) 302, 304, 306, 308 is shown. The nodes 302, 304, 306, 308 may be interconnected through any means of wired or wireless connections 310, 312, 314, 316, 320, 322 forming a peer to peer (P2P) network. Each of the nodes 302, 304, 306, 308 may be commissioned using common seed for the respective pseudo-random number generators. The common seed causes the respective pseudo-random number generators to generate the same set of pseudo-random numbers that may be used within protocol messages 323*a*-323*n* (collectively referred to as 323) between the nodes 302, 304, 306, 308. The same set of pseudo-random numbers and the protocol messages 323 may be used to authenticate new nodes into the node network 300, as described with regard to FIG. 8 below.

The node 302 may comprise an imager 324, a processing unit 326, an input/output (I/O) unit 328, a non-transitory memory 330, and a storage unit 332. For certain sensors, storage units may not be utilized. The imager 324 may be of any type including optical, laser, infrared, and/or any type of imager. The imager 324 may gather data from its environment by receiving any type of electromagnetic wave. For example, the imager 324 may capture optical and/or infrared images, for example, of its environment. The processing unit 326 may include one or more processors of any type, where the processor(s) may receive raw data, such as an image, from the imager 324 and process the data. The processor(s) may also execute the one or more software modules implementing the various embodiments described herein for generating and exchanging protocol messages 323

The non-transitory memory 330 may be any type of random access memory (RAM) from which the processing unit 326 may access raw or processed data and write one or more processor outputs thereto. The non-transitory memory 330 may further store pieces of information associated with the protocol messages 323 (see, for example, FIG. 8). Non-limiting examples of the pieces of information may include received protocol messages 323, generated protocol messages 323, private/public key pair of the node 302, and respective public keys of one or more of the other nodes 304, 306, 308.

The I/O unit 328 may handle communications with other devices, such as other nodes 304, 306, 308 and the Internet, and/or any other devices using one or more communications protocols, as understood in the art. For example, the I/O unit 328 may receive and transmit various protocol messages.

The storage unit 332 may store software modules implementing the embodiments disclosed herein. The storage unit 332 may further store pieces of information associated with the protocol messages 323, where the pieces of information may include, for example, received protocol messages 323, generated protocol messages 323, private/public key pair of the node 302, and respective public keys of one or more of the other nodes 304, 306, 308. It should be understood that the storage unit 332 may be any form of non-transitory memory.

The node 304 may include an actuator 334, a processing unit 336, an input/output (I/O) unit 338, a non-transitory memory 340, and a storage unit 342. The actuator 334 may be a mechanism configured to move and/or gather data related to physical actuation movement of the actuator 334. For example, the actuator 334 may detect when a door connected to the actuator 334 was opened or closed. The processing unit 336 may include one or more processors of any type, where the processor(s) may receive raw data from the actuator 334 and process the raw data. The processor(s) may also execute the one or more software modules implementing the various embodiments described herein. The non-transitory memory 340 may be any type of random access memory (RAM) from which the processing unit 336 may access raw or processed data and write one or more processor outputs thereto. The non-transitory memory 340 may further store may further store pieces of information associated with the protocol messages 323 (see, for example, FIG. 8). Non-limiting examples of the pieces of information may include received protocol messages 323, generated protocol messages 323, private/public key pair of the node 304, and respective public keys of one or more of the other nodes 302, 306, 308. The I/O unit 338 may handle communications with other devices, such as other nodes 302, 306, 308 and the Internet, and/or any other devices using one or more communications protocols, as understood in the art. For example, the I/O unit 338 may receive and transmit various protocol messages 323. The storage unit 342 may store software modules implementing the embodiments disclosed herein. The storage unit 342 may further store pieces of information associated with the protocol messages 323, wherein the pieces of information may include, for example, received protocol messages 323, generated protocol messages 323, private/public key pair of the node 304, and respective public keys of one or more of the other nodes 302, 306, 308. It should be understood that the storage unit 342 may be any form of non-transitory memory.

The node 306 may include an illuminator 344*a*, an imager 344*b*, a processing unit 346, an input/output (I/O) unit 348, a non-transitory memory 350, and a storage unit 352. The illuminator 344*a* may provide an illumination to the immediate environment of the node 306 and the imager 344*b* may capture images of the area illuminated by the illuminator 344*a*. The processing unit 346 may include one or more processors of any type, where the processor(s) may receive raw data from the imager 344*b* and process the raw data. The processor(s) may also execute the one or more software modules implementing the various embodiments described herein. The non-transitory memory 350 may be any type of random access memory (RAM) from which the processing unit 346 may access raw or processed data and write one or more processor outputs thereto. The non-transitory memory 350 may further store pieces of information associated with the protocol messages 323. Non-limiting examples of the pieces of information may include received protocol messages 323, generated protocol messages 323, private/public key pair of the node 306, and respective public keys of one or more of the other nodes 302, 304, 308. The I/O unit 348 may handle communications with other devices, such as other nodes 302, 304, 308 and the Internet, and/or any other devices using one or more communications protocols, as understood in the art. For example, the I/O unit 348 may receive and transmit various protocol messages 323. The storage unit 352 may store software modules implementing the embodiments disclosed herein. The storage unit 352 may further store pieces of information associated with the protocol messages 323, wherein the pieces of information may include, for example, received protocol messages 323, generated protocol messages 323, private/public key pair of the node 306, and respective public keys of one or more of the other nodes 302, 304, 308. It should be understood that the storage unit 352 may be any form of non-transitory memory.

The node 308 may include a probe 354, a processing unit 356, an input/output (I/O) unit 358, a non-transitory memory 360, and a storage unit 362. The probe 354 may gather various data such as chemical and/or biological data in the immediate environment of the node 308. The processing unit 356 may include one or more processors of any type, where the processor(s) may receive raw data from the probe 354 and process the raw data. The processor(s) may also execute the one or more software modules implementing the various embodiments described herein. The non-transitory memory 360 may be any type of random access memory (RAM) from which the processing unit 356 may access raw or processed data and write one or more processor outputs thereto. The non-transitory memory 360 may further store pieces of information associated with the protocol messages 323. Non-limiting examples of the pieces of information may include received protocol messages 323, generated protocol messages 323, private/public key pair of the node 308, and respective public keys of one or more of the other nodes 302, 304, 306. The I/O unit 358 may handle communications with other devices, such as other nodes 302, 304, 306 and the Internet, and/or any other devices using one or more communications protocols, as understood in the art. For example, the I/O unit 358 may receive and transmit various protocol messages 323. The storage unit 362 may store software modules implementing the embodiments disclosed herein. The storage unit 362 may further store pieces of information associated with the protocol messages 323, wherein the pieces of information may include, for example, received protocol messages 323, generated protocol messages 323, private/public key pair of the node 308, and respective public keys of one or more of the other nodes 302, 304, 306. It should be understood that the storage unit 362 may be any form of non-transitory memory.

Figure 1:
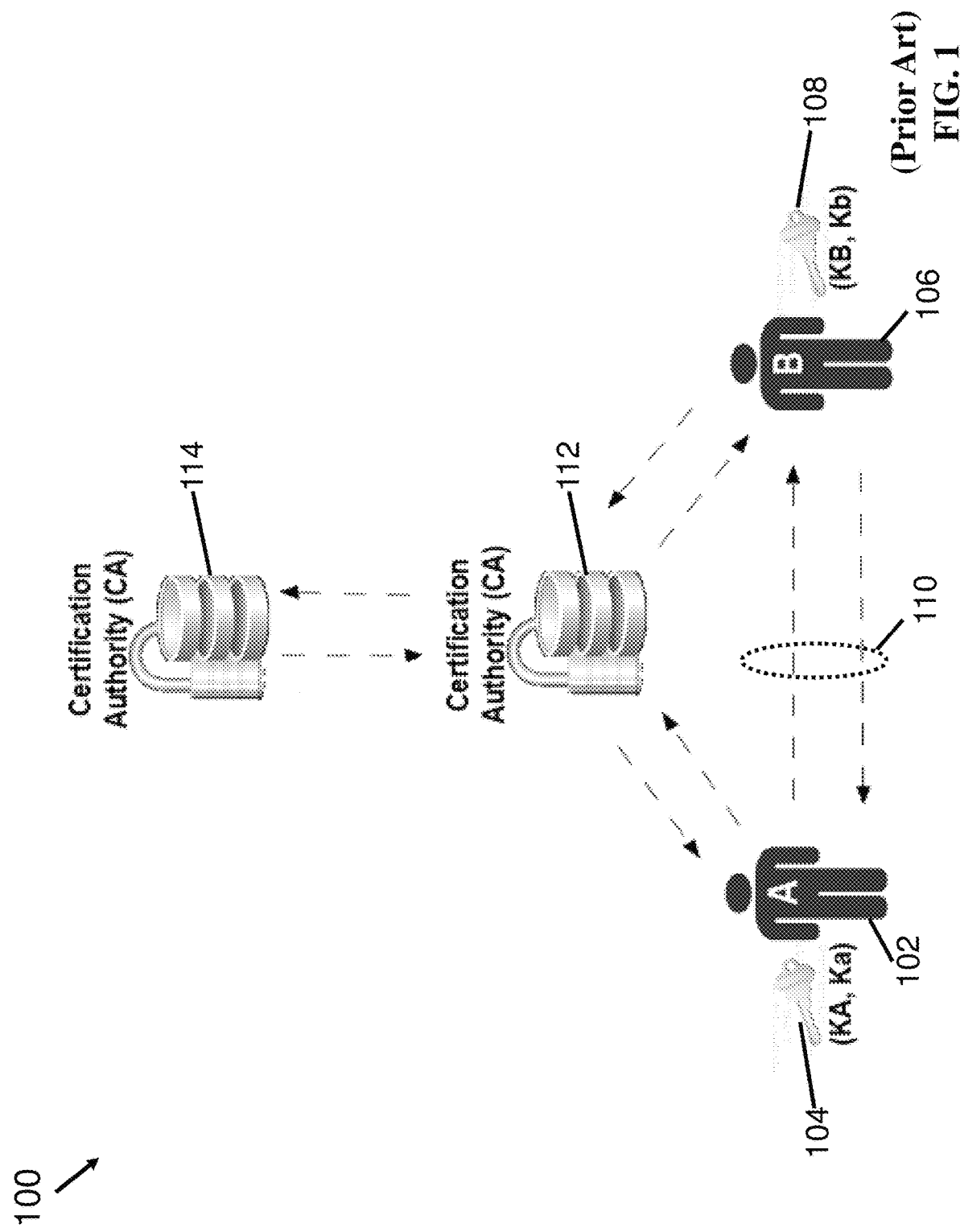
FIG. 1 is an illustration of an illustrative conventional key exchange technology using hierarchical certificate authorities.
Figure 4:
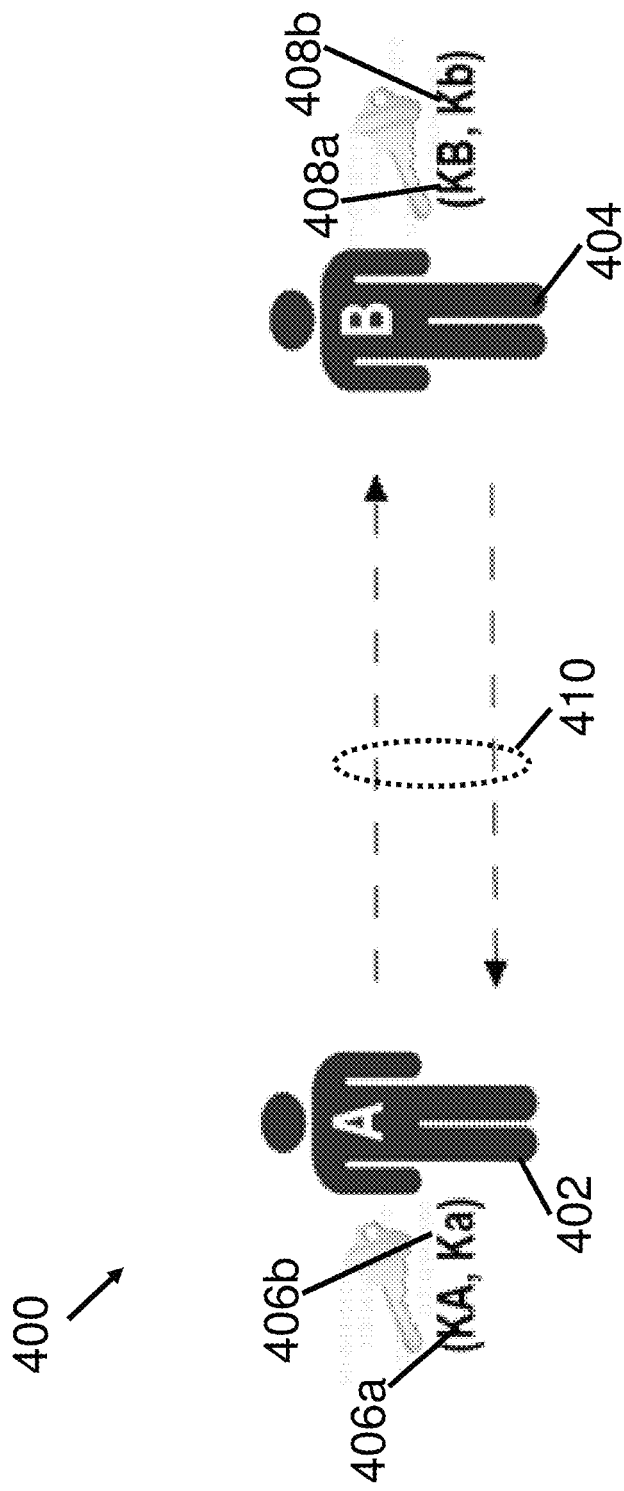
FIG. 4 is an illustration of an illustrative P2P protocol for public key exchange without using a certificate authority.

With regard to FIG. 4, an illustrative network environment 400 implementing a peer-to-peer protocol for public key exchange without a back-end public key exchange infrastructure. As shown, network nodes 402, 404 may exchange their respective public keys 406b, 408b using the embodiments and principles disclosed throughout this disclosure. The exchanged public keys 406b, 408b may be used to encrypt messages between the network nodes 402, 404, thereby establishing a secure communication channel 410 between the network nodes 402, 404. The encrypted messages then may be decrypted by the corresponding private keys 406a, 408a. Therefore, in contrast to the conventional technology 100 shown in FIG. 1 that uses an expensive back-end infrastructure of hierarchical certificate authorities, the illustrative network environment 400 may implement public key exchange without such an infrastructure, as will be described in the embodiments below.

Figure 5:
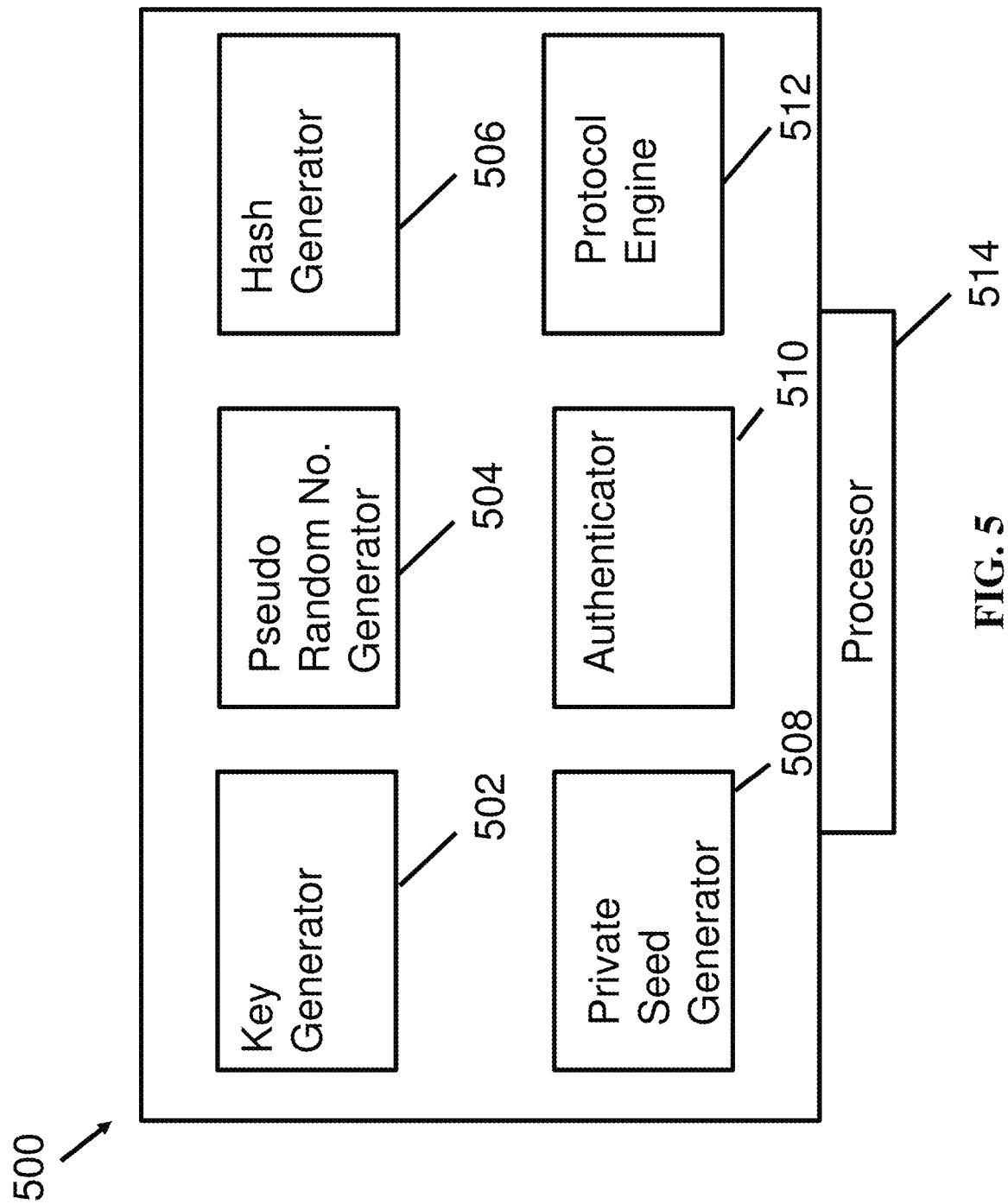
FIG. 5 is an illustration of illustrative software modules that may be executed by the nodes of FIG. 3, and be configured to implement a P2P protocol for public key exchange according to principles described herein.

With regard to FIG. 5, a block diagram illustrative software modules 500 executable by each network node of FIG. 3 for authenticating a new network node is shown. The illustrative software modules 500 may include a key generator module 502, a pseudo-random generator module 504, a hash generator module 506, a private seed generator module 508, an authenticator module 510, and a protocol engine module 512. The aforementioned software modules may be executed by a processor 514 of a network node. It should be understood that additional and/or alternative software modules 500 may be utilized. Moreover, alternative combinations of the software modules 500 may be utilized.

The key generator module 502 may generate a public/private key pair for the associated network node. The public/private key pair may be based upon, for example, Diffie-Hellman, Rivest-Shamir-Adleman (RSA), and/or Elliptic Curve Digital Signature Algorithm (ESDSA) encryption algorithms. The key generator module 502 may generate a new public/private key periodically, such as after an elapse of a predetermined amount of time and/or after a predetermined sequence of network events. The network node may use the peer-to-peer public key exchange based on the embodiments described herein to transmit the public key to other network nodes. The network node may use the private key to decrypt messages encrypted using the corresponding public key.

The pseudo-random number generator module 504 may generate pseudo-random numbers at different positions based on a common secret seed shared by other network nodes. The positions may be considered a certain number of pseudo-random numbers generated by the module 504 after using the common secret seed to generate a first pseudo-random number. The pseudo-random number generator module 504 may receive from the processor 514 a challenge position (e.g., position 15) concatenated or included within a protocol message from other network nodes, generate a pseudo-random number at the challenge position (i.e., position 15), and provide the pseudo-random number to the processor 514. The hash generator module 506 may generate a hash of data provided thereto. For example, the hash generator module 506 may receive a combination of the public key of a recipient network node with a pseudo-random number generated by the pseudo-random generator module 504 and generate a hash of the combination. The generated hash may be transmitted to the recipient network node and may be compared with at least a portion of a decrypted protocol message from the recipient network node.

The private seed generator module 508 may generate a private (or secret) seed based on a user input, such as a password. For example, the private seed generator module 508 may encode the password to generate the private seed. One having ordinary skill in the art should understand that the user may provide the same password to all the network nodes during the commissioning phase, thereby causing the private seed generator module 508 to generate a common private seed. The private seed may be used by the pseudo-random number generator 504 to generate pseudo-random numbers at one or more challenge positions.

The authenticator module 510 may authenticate a new network node into an existing secure network after a predetermined number of exchanges of protocol messages between the associated node and a new node. The authenticator module 510 may determine that there has been a match between pseudo-random numbers (and/or hashes thereof) generated locally with the received pseudo-random numbers (and/or hashes thereof). Based on this determination, the authenticator module 510 may authenticate the new network node and its public key into the existing secure network.

The protocol engine module 512 may generate and transmit protocol messages to one or more new nodes attempting to join the secure network. The protocol engine 512 may also receive protocol messages from the one or more new nodes attempting to join the secure network. Furthermore, the protocol engine 512 may generate update messages to existing nodes in the secure network indicating that the associated node has authenticated one or more new nodes into the network such that the new nodes do not have to repeat the key exchange with the other nodes.

Figure 6:
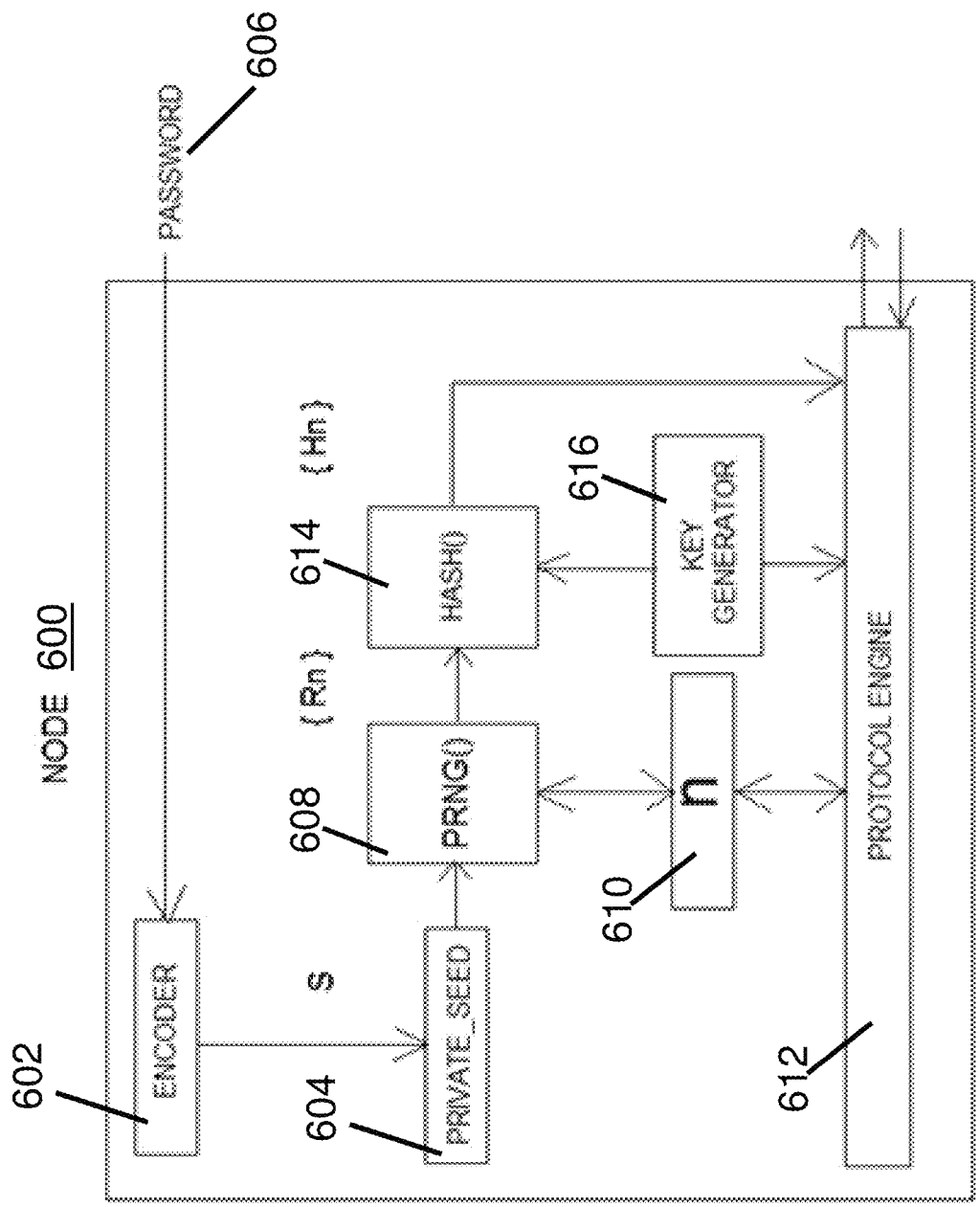
FIG. 6 is a schematic illustration of illustrative components of an illustrative node.

With regard to FIG. 6, an illustration of components of an illustrative node 600 is shown. The components as shown may be implemented as hardware, software, or a combination of hardware and software. One having ordinary skill in the art should understands the components shown herein should be considered illustrative and alternative components and/or alternative arrangements of components should be considered to be within the scope of this disclosure.

Within the illustrative node 600, an encoder 602 may implement one or more encoding algorithms to generate a private seed 604 (also referred to as a secret seed) from a password 606. In some embodiments, the password 606 may be provided by a user. Furthermore, the password 606 may be set and renewed following a predetermined policy. The pseudo-random number generator (PRNG) 608 may generate a pseudo-random number {Rn} based on the private seed 604. As described above, node 600 may be a part of a network where all the nodes are configured using a common private (or secret) seed 604. The PRNG 608 may further generate the pseudo-random number {Rn} at a position 610 (n) provided by the protocol engine 612. The hash generator 614 may generate a hash of data provided thereto. The key generator 616 may generate a public/private key pair for the node 600. The public/private key pair may be different for each node. Furthermore, the key generator 616 may generate different public/private key pairs for different instances of time. For example, after a predetermined time has elapsed since the generation of a first public/private key pairs, the key generator 616 may generate a second public/private key pair. The protocol engine 612 may manage a protocol state machine based on received and transmitted protocol messages with other networks, as described below.

Figures 7A, 7B:
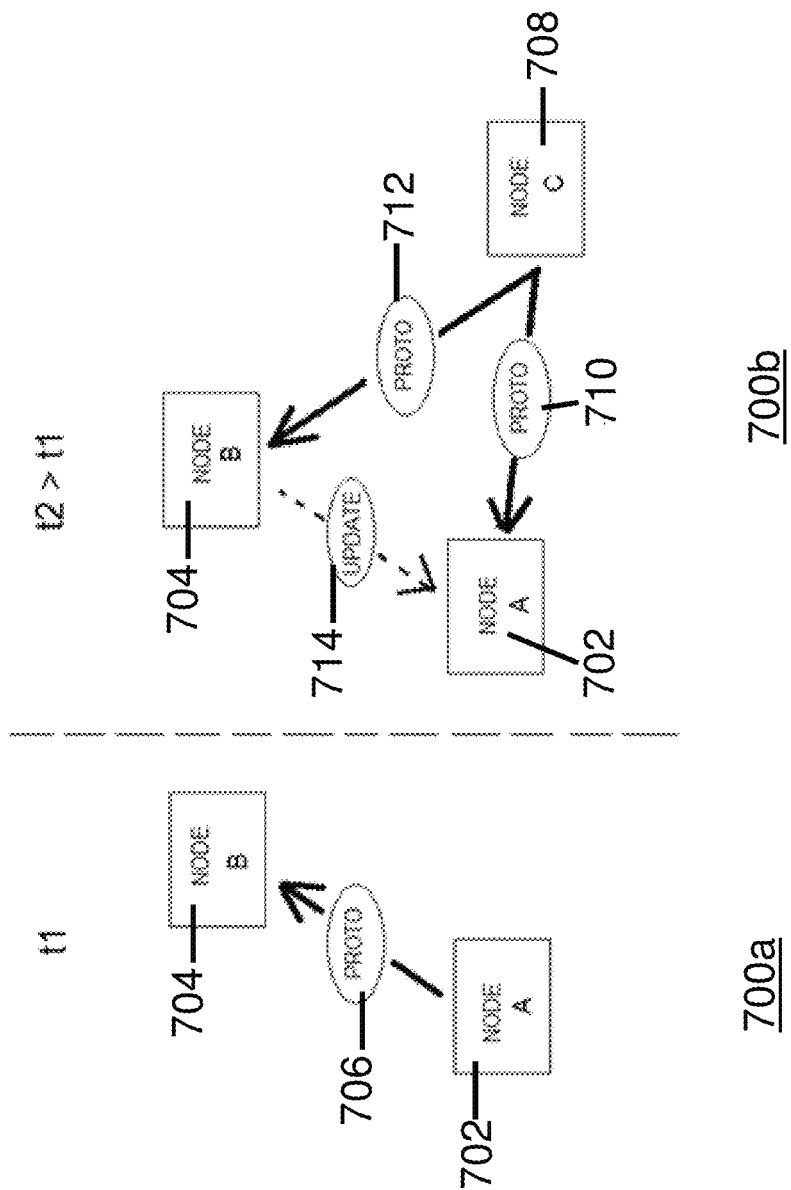
FIG. 7A is an illustration of an illustrative triggering of a P2P protocol for a public key exchange between an existing node and a new node.
FIG. 7B is an illustration of an illustrative triggering a P2P protocol for a public key exchange between two existing nodes and a new node.

With regard to FIG. 7A, an illustration of an illustrative network state 700a at time t1 is shown. At the network state 700a, new network node 702 may be attempting to join a secure network of which network node 704 may already be a part. At time t1, the new network node 702 may announce itself to the already existent network node 704 to trigger a start of a protocol 706. Details of the flow associated with the protocol 706 are described with regard to FIG. 8 below. The protocol 706 may be implemented by respective protocol engines of the network nodes 702, 704. An illustrative protocol engine has been described with regard to FIGS. 5-6 above. At the end of the protocol 706, the new node 702 may be authenticated by the network node 704 as a trusted node into the P2P network. In some implementations, the network node 704 may be the only device within the secure network. In these implementations, the secure network after the authentication may be formed by the new node 702 and the network node 704.

With regard to FIG. 7B, an illustration of an illustrative network state 700b at time t2 is shown, wherein t2>t1. At time t2, network nodes 702, 704 may already be within a trusted network, and network node 708 is a new network node attempting to access the trusted network. Node 708 may announce itself to nodes 702, 704 to trigger the respective protocols 710, 712 to start. However, only the first protocol to be triggered, in this case protocol 712, may be completed. In other words, the new node 708 may not have to complete the respective protocols for all the existing nodes on the network as any of the network nodes may authenticate the new node 708 to operate on the network in a P2P manner. After completion of the protocol 712 with existing node 704, the existing node 704 may transmit an update message 714 to the other existing node 702 that the protocol 712 has been completed such that the new network node 708 may not have to complete the protocol 710 with the network node 702. In other words, the node 704 may authenticate the new node 708 for the entire secure network.

One having ordinary skill in the art should understand that, in this way, a peer-to-peer network containing connected nodes through any type of connection, such as Ethernet or wireless with TCP/IP, may be capable of accepting new nodes at any unpredictable time. There may be no problem if a node goes down and disappears from the network. To return online, the network node may run the same protocol with a node already in the network and authenticate itself.

Figure 8:
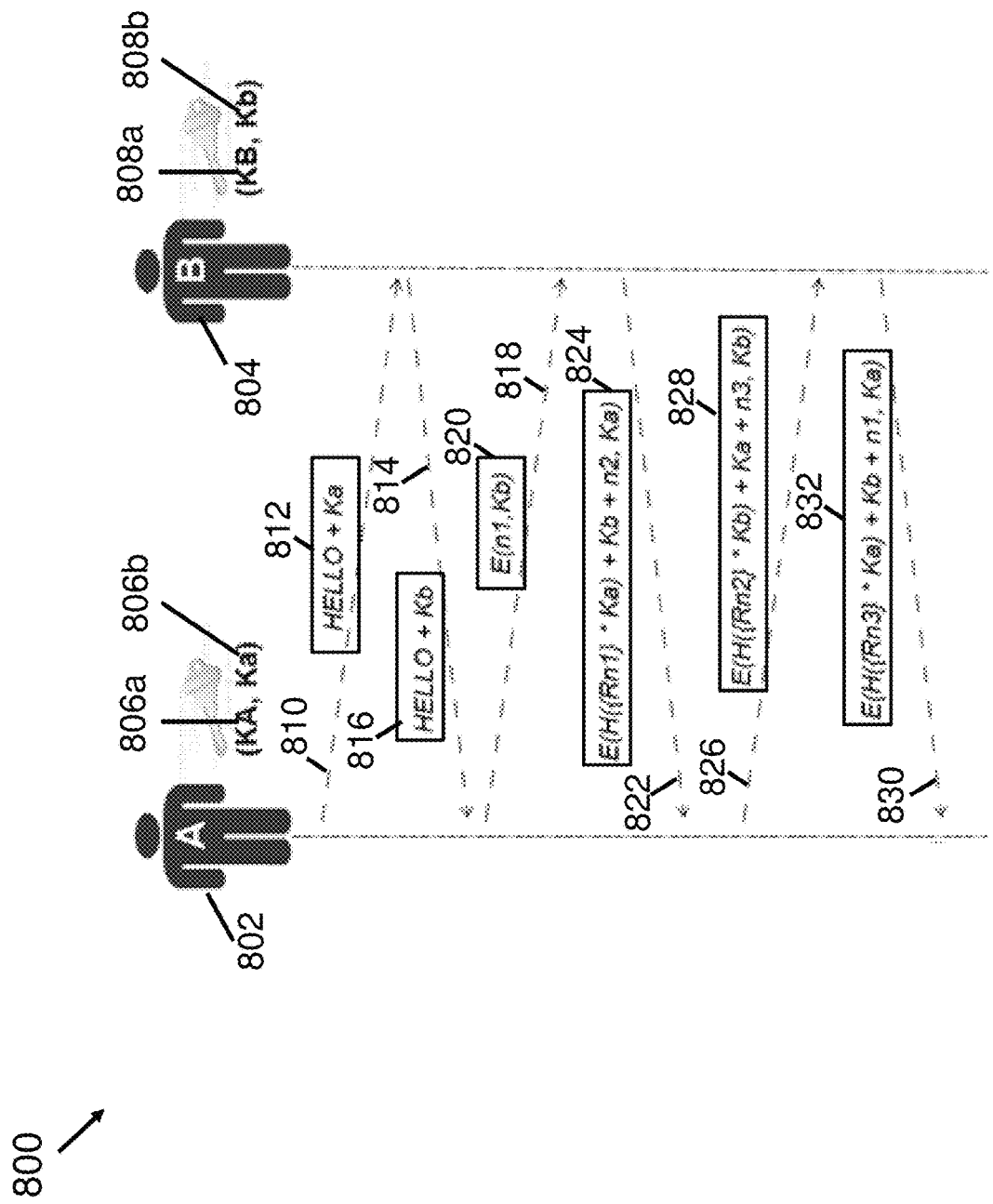
FIG. 8 is an illustration of an illustrative flow diagram of a P2P protocol for a public key exchange between an existing node and a new node.

With regard to FIG. 8, an illustrative flow diagram 800 of peer-to-peer (P2P) protocol for a secure key exchange between two nodes 802, 804 is shown. A first node 802 may be new node attempting to join a trusted network, and a second node 804 may already be in the trusted network. The first node 802 may hold a private key 806a and a public key 806b pair. The second node 804 may hold a private key 808a and a public key 808b key pair. The method described herein may facilitate a secure exchange of public keys 806b, 808b between the first and the second nodes 802, 804.

In a first step 810, the first node 802 (e.g., new node attempting to join the secure network) may transmit a protocol message 812 to the second node 804 (e.g., node already in the secure network). In some embodiments, the protocol message 812 may include a phrase or a text and the public key 806b of the first node 802. An illustrative phrase "HELLO" is shown in FIG. 8. In step 814, the second node 804 may transmit a protocol message 816 in response to the protocol message 812. The protocol message 816 may include (i) a phrase or a text and (ii) the public key 808b of the second node 804. In some embodiments, the second node 804 may include the same phrase received in the message 812 in the protocol message 816. In some embodiments, the public key 808b (Kb) transmitted by the second node 804 may have a lower numeric value as compared to the public key 806b (Ka) transmitted by the first node 802 (Kb<Ka). In other embodiments, the public key 808b (Kb) transmitted by the second node 804 may have a higher numeric value as compared to the public key 806b (Ka) transmitted by the first node 802 (Ka<Kb). The comparison between the two public keys (Kb<Ka or Ka<Kb) may be used to define the order in which the nodes start the protocol.

In step 818, the first node 802 may transmit a protocol message 820 to the second network node 804. To generate the protocol message 820, the first node 802 may generate a number n1, randomly or otherwise. The first node 802 may then encrypt the number n1 with the public key 808b of the second node 804. Mathematically, the content of the protocol message 820 may be represented in terms of the number n1 and the public key 808b (Kb) of the second node as:

$$E(n1, Kb)$$

In step 822, the second node 804 may respond to the protocol message 820 with a next protocol message 824. To generate the protocol message 824, the second node 804 may decipher the message 820 with the private key 808a of the second node 804 to retrieve the number n1. The second node 804 may then generate a pseudo-random number using a pseudo-random number generator at the n1$^{th}$ position. FIG. 6 shows an illustrative pseudo-random number generator 608. The pseudo-random number at the n1$^{th}$ position may be represented as {Rn1}. The second node 804 may then join the generated pseudo-random number {Rn1} with the public key 806b (Ka) of the first node 802 to generate {Rn1}*Ka. The second node 804 may then calculate a hash of {Rn1}*Ka. The concatenation between {Rn1} and Ka may link the hash H({Rn1}*Ka) to the first node 802. The first node 802 may not be able to reuse this part of the message to generate the pseudo-random number at the n1$^{th}$ position with other nodes. Furthermore, the second node 804 may concatenate (i) its public key 808b (Kb) and (ii) a second challenge number n2 to the generated hash. The second challenge number n2 may denote a position of a pseudo-random number to be generated by a pseudo-random number generator in the first node 802. The second node 804 may encrypt the entire message with the public key 806b (Ka) of the first node 802. Mathematically, the message 824 may be represented as:

$$E(H(\{Rn1\}*Ka)+Kb+n2,Ka)$$

In step 826, the first node 802 may generate a protocol message 828 in response to receiving the protocol message 824. To generate the protocol message 828, the first node 802 may decrypt the received protocol message 824 using the private key 806a to retrieve H({Rn})*Ka), Kb, and n2. The first node 802 may then locally generate a pseudo-random number at position n1, combine the pseudo-random number with its public key 806b and generate a hash of the combination. If the first node 802 determines that the generated hash matches H({Rn1}*Ka), the first node 802 may generate an indication that the second node 804 is a trusted node. One having ordinary skill in the art understands that extracting {Rn1} from H({Rn1}*Ka) may be a mathematically challenging problem, and the first node 802 may locally generate a local version of H({Rn1}*Ka) and perform a comparison with the received H({Rn1}*Ka). In some embodiments, the nodes 802, 804 may leave out the hashing functionality and encrypt the generated pseudo-random numbers without generating the respective hashes.

The first node 802 may further generate a second pseudo-random number {Rn2} at the position of the challenge number n2 to be included in the protocol message 828 for the first node 802 to prove its identity to the second node 804. Optionally, the first node 802 may generate a third challenge number n3 to be included in the protocol message 828. The first node 802 may then generate a hash of a combination of {Rn2} and the public key 808b (Kb) of the second node 804 that can be expressed as H({Rn2}*Kb). The first node 802 may then concatenate to the generated hash, the public key 806b (Ka) of the first node, and, optionally, the third challenge number n3. The first node 802 may then encrypt the concatenated data with the public key 808b (Kb) of the second node 804 to generate the protocol message 828. The first node 802 may then transmit the protocol message 828 to the second node 804. The protocol message 828 may be expressed mathematically as the following:

$$E(H(\{Rn2\}*Kb)+Ka+n3,Kb)$$

In step 830, the second node 804 may generate and transmit a protocol message 832 to the first node 802 responsive to receiving the protocol message 828 from the first node 802. To generate the protocol message 832, the second node 804 may decrypt the received protocol message 828 using the private key 808a to retrieve H({Rn2}*Kb), Ka, and optionally, n3. The second node 804 may then locally generate a pseudo-random number at position n2, combine the pseudo-random number with its public key 808b, and generate a hash of the combination. If the second node 804 determines that the generated hash matches H({Rn2}*Kb), the second node 804 may generate an indication that the first node 802 is a trusted node. One having ordinary skill in the art understands that extracting {Rn2} from H({Rn2}*Kb) may be a mathematically challenging problem, and the second node 804 may locally generate a local version of H({Rn2}*Kb) so as to perform a comparison with the received H({Rn2}*Kb). In some embodiments, the nodes 802, 804 may leave out the hashing functionality and encrypt the generated pseudo-random numbers without generating the respective hashes.

Optionally, the second node 804 may further generate a third pseudo-random number {Rn3} at the position of the challenge number n3 to be included in the protocol message 832 for the second node 804 to further prove its identity to the first node 802. The second node 804 may then generate a hash of a combination of {Rn3} and the public key 806b (Ka) of the first node 802 that can be expressed as H({Rn3}*Ka). The second node 804 may then concatenate to the generated hash, the public key 808b (Kb) of the second node 804, and the first challenge number n1 to indicate the end of the transmission of the protocol messages. The second node 804 may then encrypt the concatenated data with the public key 806b (Ka) of the first node 802 to generate the protocol message 832. The second node 804 may then transmit the protocol message 832 to the first node 802. The protocol message 832 may be expressed mathematically as the following:

$$E(H(\{Rn3\}*Ka)+Kb+n1,Ka)$$

At the end of the aforementioned method, both nodes 802, 804 may be considered trusted and common technologies of such as Hypertext Transfer Protocol Secure (HTTPS), Secure Sockets Layer (SSL), and/or Transport Layer Security (TLS) may be used as used for communicating between the nodes 802, 804. Furthermore, one having ordinary skill in the art should understand that the aforementioned protocol messages are merely illustrative, and other types of protocol messages may be used without deviating from the scope of this disclosure. For example, the aforementioned illustrative protocol messages include, in the hashed portion, a combination of a pseudo-random number generated by a sender node (i.e., node sending the protocol message) and the public key of the receiver node (i.e., node receiving the protocol message). As another illustration, the hashed portion may include a combination of a pseudo-random number generated by the sender node and the public key of the sender node.

Figure 9:
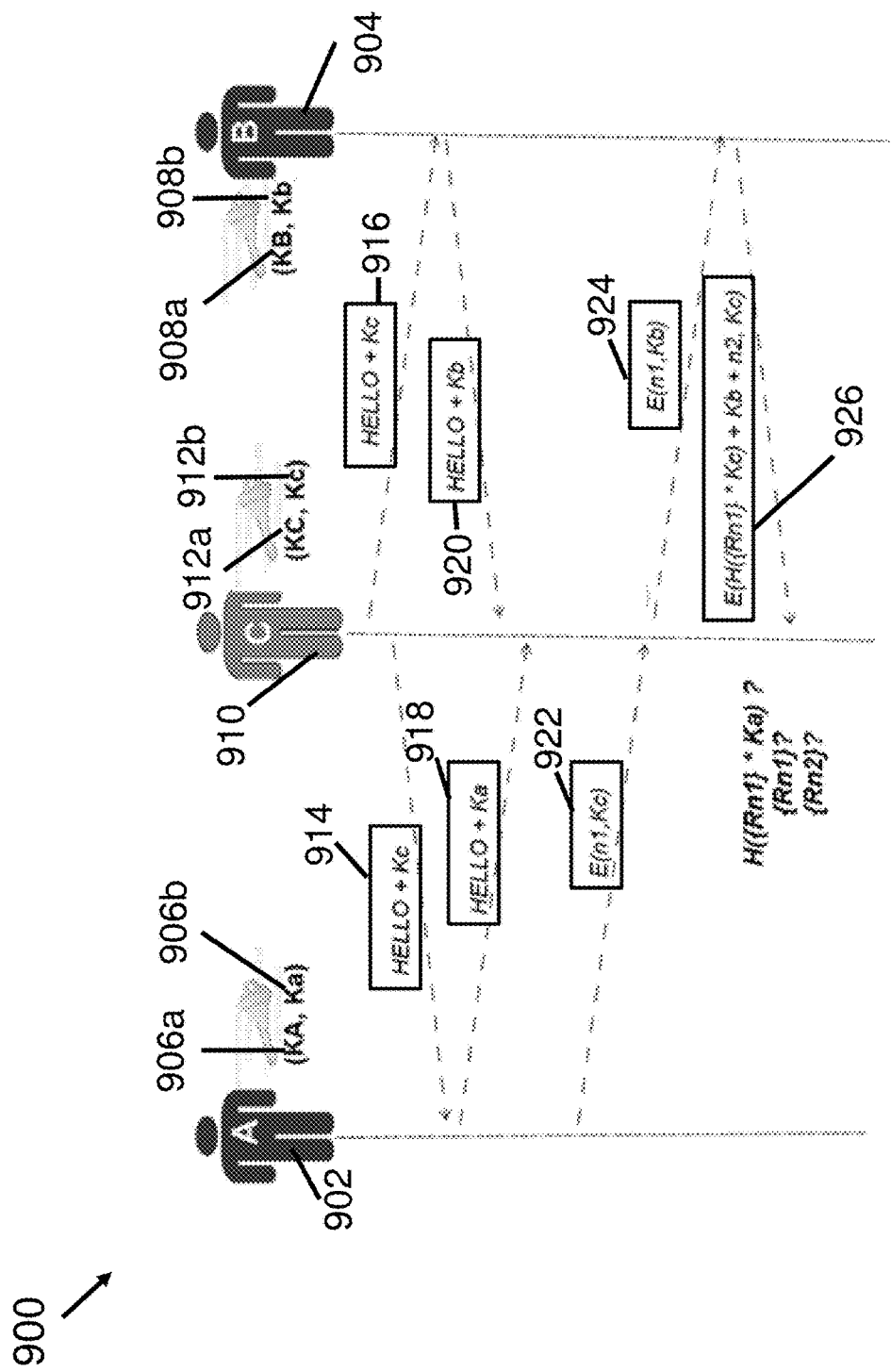
FIG. 9 is an illustration of an illustrative flow diagram of mitigating a man-in-the-middle (MITM) attack using a P2P protocol for public key exchange between an existing node and a new node.

FIG. 9 is a flow diagram of an illustrative process 900 mitigating a man-in-the-middle (MITM) attack using the embodiments described herein. As shown, nodes 902, 904 may be existing "honest nodes" within a secure network. Node 902 may hold a verified public key 906b (Ka) and its corresponding private key 906a (KA). Node 904 may hold a verified public key 908b (Kb) and its corresponding private key 908a (KB). Node 910 may be a malicious node holding a public key 912b (Kc) and its counterpart private key 912a (KC).

To initiate an MITM attack, the malicious node 910 may trigger peer-to-peer (P2P) authentication protocols by transmitting a protocol message 914 to honest node 902 and a protocol message 916 to the honest node 904. Each of the protocol messages 914, 916 may contain a text (e.g., "HELLO") and the public key 912b (Kc) of the malicious node 910. Honest node 902 may respond to malicious node 910 with a protocol message 918 containing a text (e.g., "HELLO") and the public key 906b (Ka) of the honest node 902. Honest node 904 may respond to the malicious node 910 with a protocol message 920 containing a text (e.g., "HELLO") and the public key 908b (Kb) of the honest node 904. In some embodiments, to be authenticated as legitimate node, the malicious node 910 may have to generate the public key 912b (Kc) fulfilling one of the following inequalities: Ka<Kc<Kb or Kb<Kc<Ka.

After the initial handshake through the protocol messages 914, 916, 918, 920, honest node 902 may transmit a protocol message 922 to the malicious node 910. The protocol message 922 may contain a challenge number n1 encrypted using the public key 912b (Kc) of the malicious node 910. The malicious node 910 may decrypt the protocol message 922 to retrieve n1. However, the malicious node 910 does not have a common secret root for its pseudo-random number generator and cannot generate a pseudo-random number {Rn1} at the position of n1. Therefore, the malicious node 910 may have to encrypt the challenge number n1 with the public key 908b (Kb) of the honest node 904 to generate protocol message 924. In response to receiving the protocol message 924, the honest network node 904 may generate a protocol message 926 containing {Rn} and a second challenge number n2. Details of generating the protocol message 926 have been described above with regard to FIG. 8. Mathematically, the protocol message 926 may be represented as:

E(H({Rn1}*Kc)+Kb+n2,Kc)

Upon receipt of the protocol message 926, the malicious node 910 may decrypt the message to retrieve H({Rn1}*Kc), Kb, and n2. At this point, the malicious node 910 may have two choices, where both choices are impossible to execute. First, the malicious node 910 may attempt to propagate a protocol message to honest node 902. However, the malicious node 910 cannot generate H({Rn1}*Ka) because malicious node 910 does not have the common secret root information to generate {Rn1}. Second, the malicious node 910 attempt to reply to honest node 904 in response to the protocol message 926. However, the malicious node 910 cannot generate the pseudo-random number {Rn2} for the second challenge number n2. Therefore, the attempted MITM attack by the malicious node 910 fails at this point.

Figure 10:
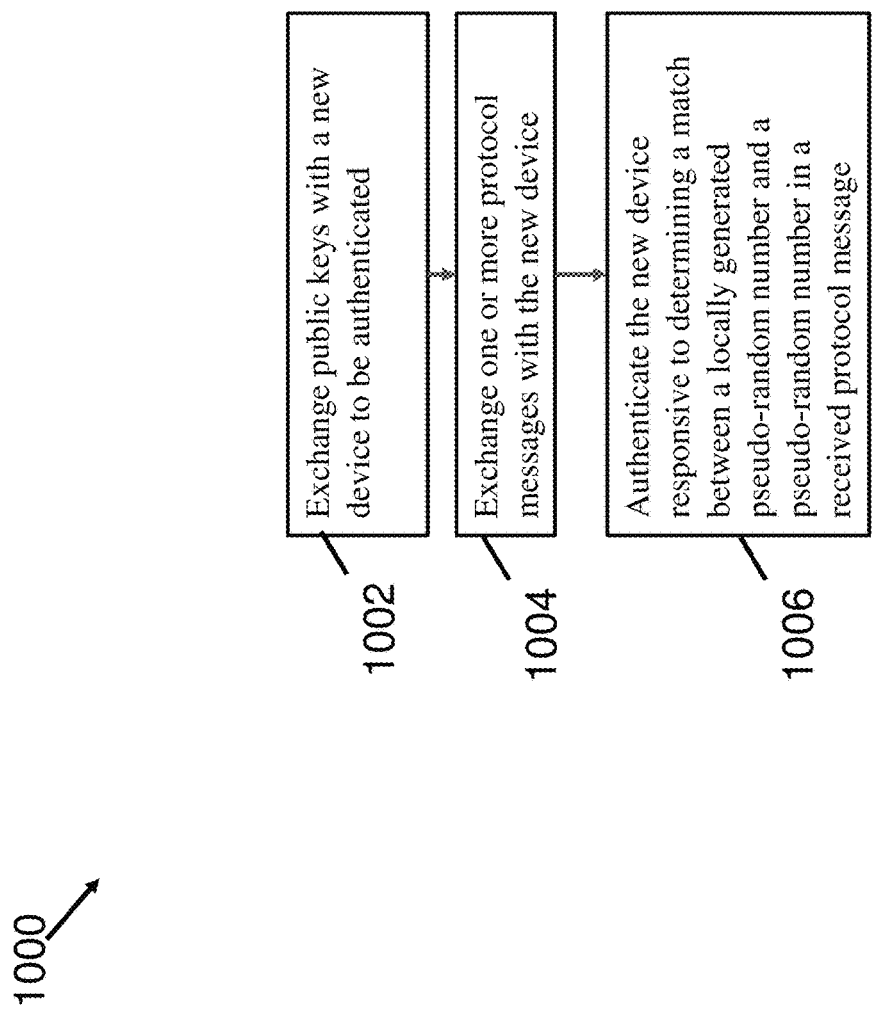
FIG. 10 is an illustration of an illustrative flow diagram of a P2P protocol for a public key exchange between an existing node and a new node.

With regard to FIG. 10, an illustration of an illustrative flow diagram 1000 of a P2P protocol for a public key exchange of an existing network node and a new device is shown. At step 1002, the network node and a new device may exchange their public keys. At step 1004, the network node may exchange one or more protocol messages with the new device. Each protocol message may contain a pseudo-random number generated by a pseudo-random number generator of either the network node or the new device being a sender using a common secret root information and at a position concatenated in a previously received protocol message, each protocol message being encrypted using the public key of the other of the network node or the new device being a receiver. At step 1006, the network node may authenticate the new device responsive to determining a match between a locally generated pseudorandom number and a pseudorandom number in a received protocol message.

Figure 11:
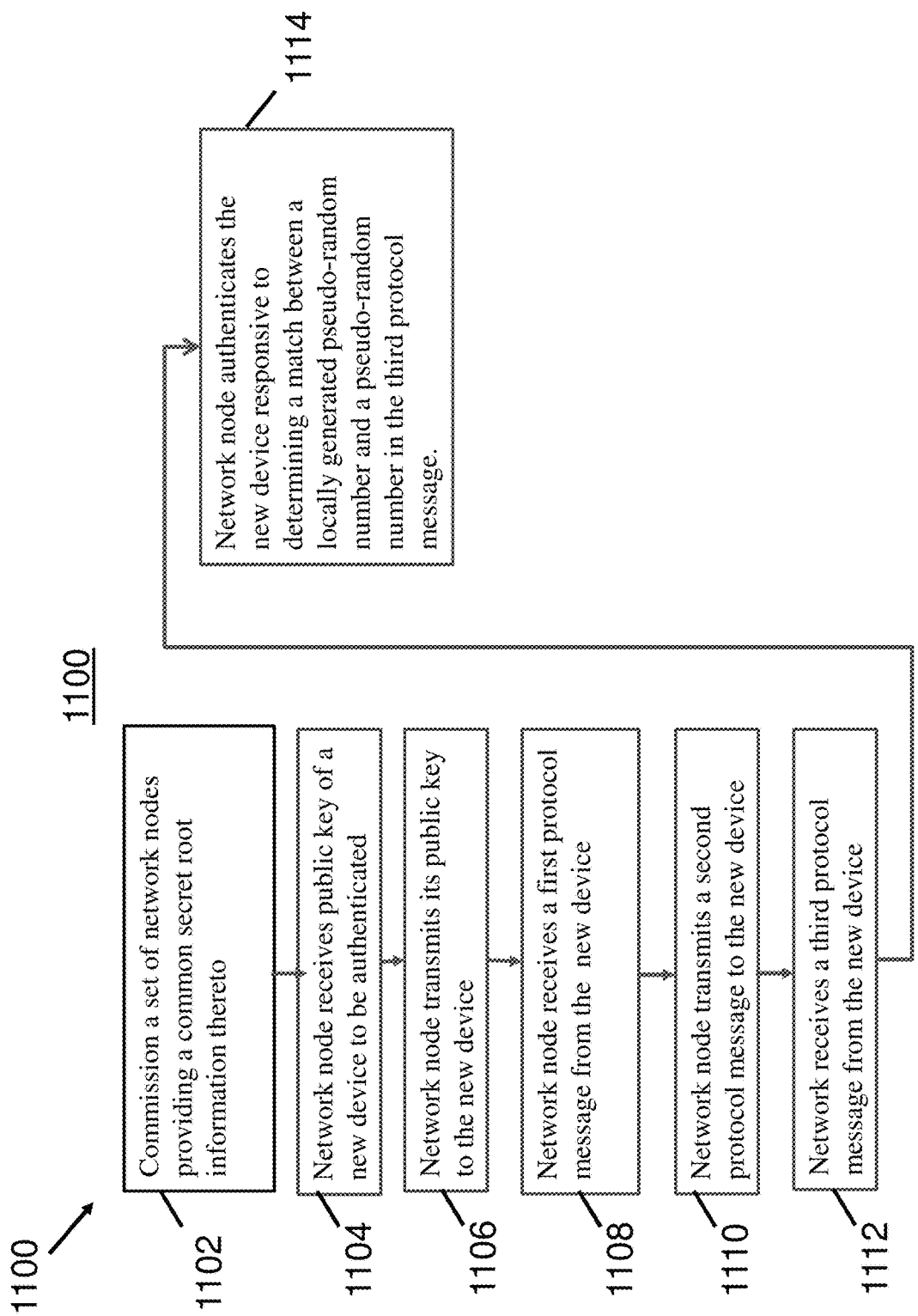
FIG. 11 is an illustrative flow diagram of a P2P protocol for a public key exchange between an existing node and a new node.

With regard to FIG. 11, an illustration of an illustrative flow diagram 1100 of a P2P protocol for a public key exchange of an existing network node and a new device is shown. At step 1102, a set of network nodes may be commissioned providing a common secret information thereto. At step 1104, a network node of the set of network nodes may receive a public key of a new device to be authenticated. At step 1106, the network node may transmit its public key to the new device. At step 1108, the network node may receive a first protocol message from the new device. The first protocol message may contain first position for a first pseudo-random number, the first protocol message being encrypted with the public key of the network node. At step 1110, the network node may transmit a second protocol message to the new device. The second protocol message may contain the first pseudo-random number at the first position generated by the network node using the common secret root information and containing a second position of a second pseudo-random number. The protocol message may be encrypted using the public key of the new device. At step 1112, the network node may receive a third protocol message from the new device. At step 1114, the network node may authenticate the new device response to determining a match between a locally generated pseudo-random number and a pseudo-random number in the third protocol message.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method for authenticating a new device to operate in a network, the method comprising:
    exchanging, by a network node on the network, public keys with the new device to be authenticated;
    exchanging, by the network node, one or more protocol messages with the new device, each protocol message containing a pseudo-random number generated by a pseudo-random number generator of either the network node or the new device being a sender using a common secret root information of each network node on the network and received from a user at a commissioning phase, and at a position concatenated in a previously received protocol message, each protocol message being encrypted using the public key of the other of the network node or the new device being a receiver; and
    authenticating, by the network node, the new device to the network responsive to the network node determining that a pseudorandom number in a received protocol message matches the pseudorandom number generated locally by the network node at a position concatenated in a previously sent protocol message.

2. The method according to claim 1 further comprising: commissioning network nodes using the common secret root information, and further comprising encoding the common secret root information to generate a common private seed.

3. The method according to claim 1, wherein a portion of each protocol message is hashed.

4. The method according to claim 3, wherein the hashed portion of each protocol message includes at least a combination of a pseudo-random number generated by the pseudo-random number generator of the sender and the public key of the receiver or the sender.

5. The method according to claim 1, wherein determining that the pseudorandom number in a received protocol message matches the pseudorandom number generated locally by the network node includes comparing a hashed portion in the received protocol message with a locally generated hash.

6. The method according to claim 1, further comprising: decrypting, by the network node, the received protocol message using a private key of the network node.

7. The method according to claim 1, wherein each protocol message further contains a next position of a pseudo-random number to be generated by the receiver.

8. The method according to claim 1, further comprising: transmitting, by the network node, an update message to at least one other network node on the network responsive to authenticating the new device, the update message indicating that the new device has been authenticated by the network node.

9. The method according to claim 1, wherein the common secret root information is changed periodically.

10. A system for authenticating a new device to operate in a network, the system comprising:
    a plurality of network nodes forming the network, the network being a peer-to-peer network;
    a network node on the network, the network node configured to:
        exchange public keys with the new device to be authenticated;
        exchange one or more protocol messages with the new device, each protocol message contains a pseudo-random number generated by a pseudo-random number generator of either the network node or the new device being a sender using a common secret root information of each network node on the network and received from a user at a commissioning phase, and at a position concatenated in a previously received protocol message, each protocol message being encrypted using the public key of the other of the network node or the new device being a receiver; and
        authenticate the new device to the network responsive to the network node determining that a pseudorandom number in a received protocol message matches the pseudorandom number generated locally by the network node at a position concatenated in a previously sent protocol message.

11. The system according to claim 10, wherein the plurality of network nodes are commissioned using the common secret root information.

12. The system according to claim 10, wherein a portion of each protocol message is hashed.

13. The system according to claim 12, wherein the hashed portion of each protocol message includes at least a combination of a pseudo-random number generated by the pseudo-random number generator of the sender and the public key of the receiver or the sender.

14. The system according to claim 10, wherein the network node is further configured to:
compare a hashed portion in the received protocol message with a locally generated hash.

15. The system according to claim 10, wherein the network node is further configured to: decrypt the received protocol message using a private key of the network node.

16. The system according to claim 10, wherein each protocol message further contains a next position of a pseudo-random number to be generated by the receiver.

17. The system according to claim 10, wherein the network node is further configured to:
transmit an update message to at least one other network node on the network responsive to authenticating the new device, the update message indicating that the new device has been authenticated by the network node.

18. A method of authenticating a new device to operate in a network, the method comprising:
commissioning a set of network nodes by providing a common secret root information thereto of each network node on the network and received from a user at a commissioning phase;
receiving, by a network node of the set of network nodes, a first public key from the new device to be authenticated to the network;
transmitting, by the network node, a second public key of the network node to the new device;
receiving, by the network node from the new device, a first protocol message containing a first position for a first pseudo-random number, the first protocol message being encrypted with the second public key;
transmitting, by the network node to the new device, a second protocol message containing the first pseudo-random number at the first position generated by the second network node using the common secret root information of each network node on the network and received from a user at a commissioning phase, and containing a second position of a second pseudo-random number, the second protocol message being encrypted with the first public key;
receiving, by the network node from the new device, a third protocol message encrypted using the second public key in response to the second protocol message; and
authenticating, by the network node, the new device to the network responsive to the network node determining that a pseudo-random number in the third protocol message matches a pseudo-random number generated by the network node at the second position using the common secret root information.

19. The method according to claim 18, wherein a portion of each protocol message is hashed.

20. The method according to claim 18, wherein determining the pseudo-random number in the third protocol message matches the pseudo-random number generated by the network node at the second position includes comparing a hashed portion of the third protocol message with a locally generated hash.

* * * * *